Feb. 15, 1955     K. A. BEIER     2,702,087
FAN ASSEMBLY
Filed March 26, 1951
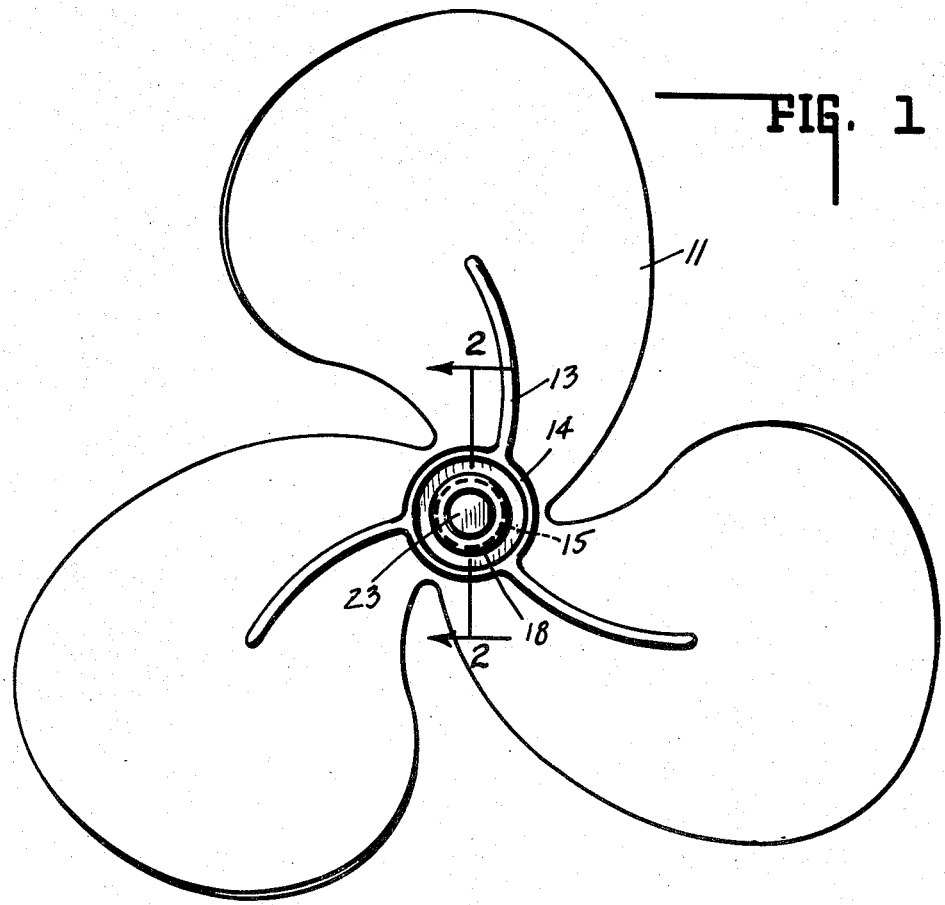
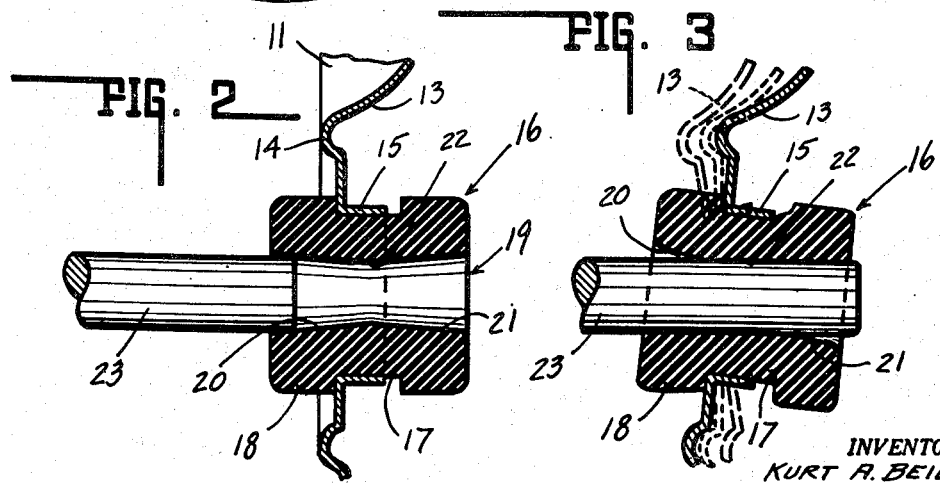
INVENTOR.
KURT A. BEIER.
BY
*Lockwood, Hahn, Galt & Woodard*
ATTORNEYS.

|| United States Patent Office 2,702,087
Patented Feb. 15, 1955

2,702,087

FAN ASSEMBLY

Kurt A. Beier, Indianapolis, Ind., assignor to Schwitzer-Cummins Company, a corporation Application March 26, 1951, Serial No. 217,581

2 Claims. (Cl. 170—173)

This invention relates to a fan assembly, and particularly the structure of the hub mounting of rubber or like resilient and deformable material, for supporting a fan or rotatable body upon a driving shaft.

Invention is directed to the form and shape of the internal bore of the hub in which the driving shaft is received in association with the external structure surrounding the hub and cooperating with the shape of the bore to perform new and useful functions in both the mounting and the driving of the fan or rotative element on and in respect to the driving shaft.

It is not unusual to drive a fan or the like from a shaft through a rubber mounting, hub or sleeve for sound or vibration isolation or to permit of self alignment. This invention is directed to such structure for accomplishing substantially the same purposes as heretofore, but in a more facile and economical manner.

The feature of the invention, therefore, resides in the form or shape of the bore extending longitudinally or axially through the rubber hub wherein it is inwardly tapered from opposite ends to a reduced or restricted central portion, and wherein such restricted central portion is of less diameter than the shaft upon which the hub is mounted with its outwardly flared ends of slightly greater diameter, and wherein a rigid or non-elastic restraining sleeve surrounds the hub about the reduced or restricted central portion thereof and spaced inwardly from the outwardly flared ends.

As a result of this structure the hub may be readily mounted over the shaft and retained in its mounted position, without requiring any of the usual locking or retaining means, through its gripping action, due to the displacement of the rubber. This condition substantially increases its area of contact and resistance to displacement relative to the shaft. Thus, by means of this invention the usual locking rings, screws and the like are eliminated.

Further, by reason of the form and structure of the hub in its assembly, the reduced or restricted central portion of the bore provides a fulcrum bearing about which the fan sleeve may rock on the shaft so as to be highly flexible angularly of its axis to permit the fan or rotated element to seek its natural plane of rotation irrespective of wobble or misalignment of the shaft. Such rocking and flexing of the hub also permits balancing out of the aerodynamic forces acting upon the individual blades of a fan when comprising the rotative element.

The full nature of the invention will be understood from the accompanying drawings and the following description and claims:

Fig. 1 is an end view of the fan assembly viewed toward the free end of the driving shaft.

Fig. 2 is a central vertical section through the hub before mounting on the shaft with parts broken away and taken generally on the line 2—2 of Fig. 1.

Fig. 3 is a section of the assembly mounted on the shaft shown in elevation illustrative of the angular flexibility thereof.

In the drawings there is disclosed a rotative member shown herein as comprising a fan having radial fan blades 11, a spider formation 13 provided with a reinforcing head 14 terminating in an annular sleeve element 15. The fan shown herein consists of a single integral stamping wherein the sleeve 15 is formed with an axially-extending flange for receiving the rubber hub assembly. As hereinafter pointed out, the flanged sleeve 15 co-acts with the rubber hub assembly to serve as a restraining element.

The hub, generally indicated at 16 in Fig. 2, is formed of a flexible and displaceable resilient material, preferably of rubber or rubber composition, and which for convenience will be hereinafter referred to merely as a "rubber hub." Said hub is somewhat elongated relative to its bore, but having a length approximating that of its diameter with a reduced portion 17 formed about its periphery intermediate its ends to provide a seat for the sleeve 15. Said grooved portion 17 is embraced by the enlarged end portions 18 of greater diameter, whereby the exterior formation of the hub is of saddle-like contour for seating and retaining the sleeve 15 positioned intermediate its ends.

The bore of the hub indicated at 19 extends therethrough axially and concentrically of the grooved portion 17 and the sleeve 15 mounted thereabout. Said bore is tapered inwardly from opposite ends toward the center, as indicated at 20 and 21, respectively, the inwardly flared portions terminating in a reduced restricted portion of the bore indicated at 22. Said hub is adapted to be mounted on the driving shaft 23. The central reduced portion of the bore 22 is formed of less diameter than the shaft 23 upon which the hub is to be mounted while the extreme ends of the tapered portions 20, 21 of the bore are of larger diameter than the shaft. The average diameter of the bore of the hub is approximately one-third the diameter of the hub, which in turn is approximately that of the length thereof. Such relative dimensions provide sufficient body in the hub to provide for the functions hereinafter set forth.

In effecting the assembly of the above structure the rubber hub 16 has one end thereof distorted sufficiently to insert it through the central aperture formed by the sleeve 15, which then seats firmly about the grooved portion 17 but without displacing the body. A suitable lubricant is then applied to the end surface of the shaft 23 or the interior of the bore 19, or both, whereupon the outwardly flared end of the bore is engaged about the end of the shaft, as shown in Fig. 2. With combined axial pressure and, if desired, simultaneous oscillation, the hub is forced entirely over the end of the shaft to the position shown in Fig. 3. As the hub is forced over the shaft, the reduced portion of the bore 22 wipes off the major portion of the lubricant, with some remaining film of lubricant being absorbed by the rubber or like composition.

After the hub has thus been placed over the shaft, with the consequent removal of the lubricant, a relatively high coefficient of friction between the surfaces will result, tending to resist axial displacement between the hub and shaft. However, additional resistance to axial displacement results from the fact that the rubber is caused to flow from the central portion of the bore toward each end thereof, due to the displacement thereof between the shaft and the restraining element or sleeve 15. This materially increases the surface contact between the shaft and hub. The total result of the direct rubber to metal contact over an increased area resists axial displacement and thereby firmly secures it in place on the shaft for all practical purposes, such as to require no restraining means, i. e., the usual locking ring, nut or screw.

The above-described structure of the hub in combination with the restraining element or sleeve 15, permits the hub to fulcrum about its central portion, as illustrated in Fig. 3. This is due to the fact that the body of the hub is under greater compressive force at its central portion due to the restraining sleeve 15, than toward the opposite ends thereof, coupled with the fact that the bore tapers inwardly from its relatively enlarged outer ends to its central reduced portion. This permits of greater flexibility at each end than in the center to permit of such rocking motion. The rocking action renders the assembly more flexible angularly of its axis to permit the fan to seek its natural plane of rotation, irrespective of wobble or misalignment of the shaft, and further in the case of a fan to provide for balancing out the areodynamic forces acting upon the individual blades. Such fan will accordingly operate smoother, and with a minimum of vibration. This is illustrated in Fig. 3, showing the hub rocked to one extreme position in full lines and to the other extreme position in the outer dotted lines of the spider portion of the fan, and with the normal position of the fan spider indicated by the intermediate dotted lines.

Of course, it will be obvious that as in the case of all rubber mounted fans and the like, the substantial body portion of the hub will provide sound or vibration isolation.

The invention claimed is:

1. In a fan assembly, the combination with a fan having a rigid annular sleeve defining a central opening therein and having blades extending radially therefrom, a shaft for supporting and driving said fan extending through said sleeve, a cylindrical hub of yieldable and displaceable material having high coefficient of friction interposed between said shaft and sleeve, said hub being approximately three times the length of said sleeve and having an annular grooved portion formed about the periphery thereof midway between its ends for receiving said sleeve, said annular groove being normally of the same outside diameter as the inside diameter of said sleeve, and an axial bore extending through said hub tapered inwardly from opposite ends thereof toward its center with its central portion normally of less diameter than said shaft and defining a minimum diameter to provide for displacement of said material between said shaft and sleeve upon said shaft being mounted therethrough, the outer ends of said bore being normally of greater diameter than said shaft and the external diameter of said hub being approximately three times that of said bore and substantially equal to the length thereof, whereby insertion of said shaft within said bore will cause said hub material within said sleeve to be displaced axially toward opposite ends thereof to provide a fulcrum bearing about which said sleeve may rock on said shaft, the minimum diameter hub bore portion being contained within the axial length of said annular sleeve.

2. In a fan assembly, the combination with a fan having a rigid annular sleeve defining a central opening therein and having blades extending radially therefrom, a shaft for supporting and driving said fan extending through said sleeve, a cylindrical hub of yieldable and displaceable material having high coefficient of friction interposed between said shaft and said sleeve and having its external surface secured in driving connection with said sleeve, said hub being of a length to extend at its ends a substantial distance beyond the ends of said sleeve, said hub having an axial bore tapered inwardly from opposite ends thereof toward its center with its central portion normally of less diameter than said shaft defining a minimum diameter to provide for displacement of said material between said shaft and sleeve beyond the ends of the latter upon said shaft being mounted therethrough, the outer ends of said bore being normally of greater diameter than said shaft, whereby insertion of said shaft within said bore will cause said hub material within said sleeve to bind with said shaft at said minimum diameter and to be displaced axially on opposite sides thereof to provide a fulcrum bearing about which said sleeve may rock on said shaft, the minimum diameter hub bore portion being contained within the axial length of said annular sleeve.

References Cited in the file of this patent

UNITED STATES PATENTS

| 2,164,485 | Yantis | July 4, 1939 |
| 2,354,101 | Broders | July 18, 1944 |
| 2,468,985 | Krotz | May 3, 1949 |
| 2,558,589 | Skolfield | June 26, 1951 |